United States Patent
Pamley et al.

(10) Patent No.: US 9,417,672 B2
(45) Date of Patent: Aug. 16, 2016

(54) SEPARATE CUSTOMIZABLE THERMAL CONTROL TABLE

(75) Inventors: Marc Richard Pamley, Durham, NC (US); Omar Ali Ali, Morrisville, NC (US); Cory Allen Chapman, Durham, NC (US); Timothy Samuel Farrow, Cary, NC (US); William Fred Keown, Jr., Raleigh, NC (US); Albert Vincent Makley, Morrisville, NC (US); James A. Pfaltzgraff, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 505 days.

(21) Appl. No.: 13/436,413

(22) Filed: Mar. 30, 2012

(65) Prior Publication Data

US 2013/0258574 A1 Oct. 3, 2013

(51) Int. Cl.
G06F 1/00 (2006.01)
G06F 1/20 (2006.01)
G06F 9/445 (2006.01)

(52) U.S. Cl.
CPC .. *G06F 1/206* (2013.01); *G06F 8/65* (2013.01)

(58) Field of Classification Search
CPC ... G06F 9/4411; G06F 11/0793; G06F 1/206; G06F 8/65
USPC .......... 713/1, 300, 100, 156, 2; 388/811, 804; 709/222; 715/810; 714/2, 6.21
See application file for complete search history.

(56) References Cited

U.S. PATENT DOCUMENTS

| | | | | |
|---|---|---|---|---|
| 7,742,688 B2* | 6/2010 | Zou et al. | ...... | 388/811 |
| 7,844,170 B2* | 11/2010 | Yao et al. | ...... | 388/804 |
| 8,230,211 B2* | 7/2012 | Shao et al. | ...... | 713/100 |
| 8,761,956 B2* | 6/2014 | Chen et al. | ...... | 700/300 |
| 2005/0204125 A1* | 9/2005 | Chin | ...... | 713/100 |
| 2006/0020844 A1* | 1/2006 | Gibbons et al. | ...... | 714/2 |
| 2006/0178786 A1* | 8/2006 | Bhagwath et al. | ...... | 700/300 |
| 2007/0200517 A1* | 8/2007 | Chen | ...... | 318/268 |
| 2008/0148031 A1* | 6/2008 | Brown et al. | ...... | 713/1 |
| 2008/0189541 A1* | 8/2008 | Huang | ...... | 713/2 |
| 2008/0215868 A1* | 9/2008 | Lee et al. | ...... | 713/1 |
| 2008/0256350 A1* | 10/2008 | Hattori et al. | ...... | 713/1 |
| 2009/0019390 A1* | 1/2009 | Su | ...... | 715/810 |
| 2009/0132799 A1* | 5/2009 | Brumley et al. | ...... | 713/100 |
| 2009/0177334 A1* | 7/2009 | Artman et al. | ...... | 700/300 |
| 2009/0177877 A1* | 7/2009 | Holdaway et al. | ...... | 713/2 |
| 2009/0319782 A1* | 12/2009 | Lee | ...... | 713/156 |
| 2009/0327687 A1* | 12/2009 | Springfield et al. | ...... | 713/100 |
| 2010/0042710 A1* | 2/2010 | Lin | ...... | 709/222 |
| 2010/0205422 A1* | 8/2010 | Shao et al. | ...... | 713/2 |
| 2011/0225274 A1* | 9/2011 | Dvorkin et al. | ...... | 709/222 |
| 2011/0245991 A1* | 10/2011 | Keown et al. | ...... | 700/300 |
| 2011/0296236 A1* | 12/2011 | Kawamoto et al. | ...... | 714/6.21 |
| 2012/0041615 A1* | 2/2012 | Chang | ...... | 700/300 |
| 2012/0123610 A1* | 5/2012 | Tupa et al. | ...... | 700/300 |

* cited by examiner

*Primary Examiner* — Aurel Prifti
(74) *Attorney, Agent, or Firm* — Kunzler Law Group (57) ABSTRACT

An apparatus, system, and method are disclosed for providing customized thermal control data structures. The default thermal control data structure is typically stored in a first storage device of the IOS module of the information processing system. A custom thermal control data structure is stored on a second storage device that is separately updatable from the first storage device. The thermal cooling module that provides cooling for the information processing system is directed to use the custom thermal control data structure for cooling components of the information processing system.

19 Claims, 6 Drawing Sheets

SEPARATE CUSTOMIZABLE THERMAL CONTROL TABLE

FIELD

The subject matter disclosed herein relates to thermal control in computing devices.

BACKGROUND

1. Description of the Related Art

Computing devices generate heat. In many computing devices, passive cooling (such as natural convection) is insufficient, and active cooling is necessary to keep the computing device from reaching unacceptable temperatures. Fans are often used as active cooling components to keep the temperature of the computing device within acceptable boundaries. For example, a computing device may have a case mount fan, a power supply fan, a central processing unit (CPU) fan, and others to provide active cooling for the computing device. Other active cooling devices (such as heat pipes, refrigeration devices, and others) may be used in addition to, or in place of, fans. These active cooling devices may be controlled by a thermal cooling module.

The thermal cooling module within the computing device may require access to thermal control data structures as part of normal operations. For example, a fan may need access to a thermal control table that provides certain data concerning operation of the fan. The thermal control data structure is typically contained within the input output system (IOS), such as the basic input output system (BIOS), that is stored in non-volatile memory such as erasable programmable read only memory (EPROM), electrically erasable programmable read-only memory (EEPROM), or other non-volatile memory.

Updating the thermal control tables generally requires that the user update the entire IOS. However, many customers do not want to update the entire IOS, and prefer to use a fixed level of IOS in order to avoid going through the time and expense associated with validating the updated IOS. As a result, the customer is forced to choose between using updated or customized thermal control tables and continuing to use a particular level of IOS. Many customers may choose to forgo the benefits of using updated or customized thermal control tables as a result.

BRIEF SUMMARY

Based on the foregoing discussion, the inventors have recognized a need for an apparatus, system, and method that allows for customization of thermal control data structures, such as thermal control tables.

The apparatus is provided with a plurality of modules configured to functionally execute the necessary steps of gesture mode selection. These modules in the described embodiments include a customization module and a guidance module. The customization module stores a custom thermal control data structure in a second storage device that is separately updatable from a first storage device storing an input output system (IOS) module. The IOS module comprises a default thermal control data structure. The guidance module directs a thermal cooling module to use the custom thermal control data structure for cooling one or more components of an information processing system.

The thermal cooling module may use the default thermal control data structure by default. The customization module may also receive one or more values for the custom thermal control data structure and update the custom thermal control data structure with the one or more values. The guidance module may direct the thermal cooling module to use the custom thermal control data structure in response to a user selecting the custom thermal control data structure. In certain embodiments, directing the thermal cooling module to use the custom thermal control data structure may comprise creating one or more entries in configuration registers. These entries may direct the thermal cooling module to the custom thermal control data structure stored in the second storage device.

The apparatus may also include a setup module that receives a selection of the custom thermal control data structure from the user. The apparatus may include a reset module that restores the custom thermal control data structure to values in the default thermal control data structure in response to the IOS module being restored to default values. The apparatus may also include a default module that directs the thermal cooling module to use the default thermal control data structure stored in the first storage device in response to the custom thermal control data structure being corrupted.

In certain embodiments, the invention may be realized as a method. The method may involve storing a custom thermal control data structure in a second storage device that is separately updatable from a first storage device storing the IOS module that includes a default thermal control data structure. The method may also involve receiving a selection of the custom thermal control data structure, and causing a thermal cooling module to use the custom thermal control data structure for cooling one or more components of an information processing system in response to receiving the selection.

The method may also involve receiving one or more values for the custom thermal control data structure and updating the custom thermal control data structure with the one or more values. In certain embodiments, the method involves restoring the custom thermal control data structure to values in the default thermal control data structure in response to the IOS module being restored to default values. The method may also involve initially populating the custom thermal control data structure with one or more values in the default thermal control data structure.

In certain embodiments, the method involves directing the thermal cooling module to use the default thermal control data structure stored in the first storage device in response to the custom thermal control data structure being corrupted. The method may include directing the thermal cooling module to use the default thermal control data structure stored in the first storage device in response to the information processing system being started in a safe mode.

The invention may be realized as a computer program product comprising a storage device storing machine readable code that is executed by a processor to perform operations. The operations may include storing a custom thermal control data structure in a second storage device that is separately updatable from a first storage device storing the IOS module comprising a default thermal control data structure, receiving a selection of the custom thermal control data structure, and directing a thermal cooling module to use the custom thermal control data structure for cooling one or more components of an information processing system in response to receiving the selection.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the FIGS. illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated FIGS.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Figure 1:
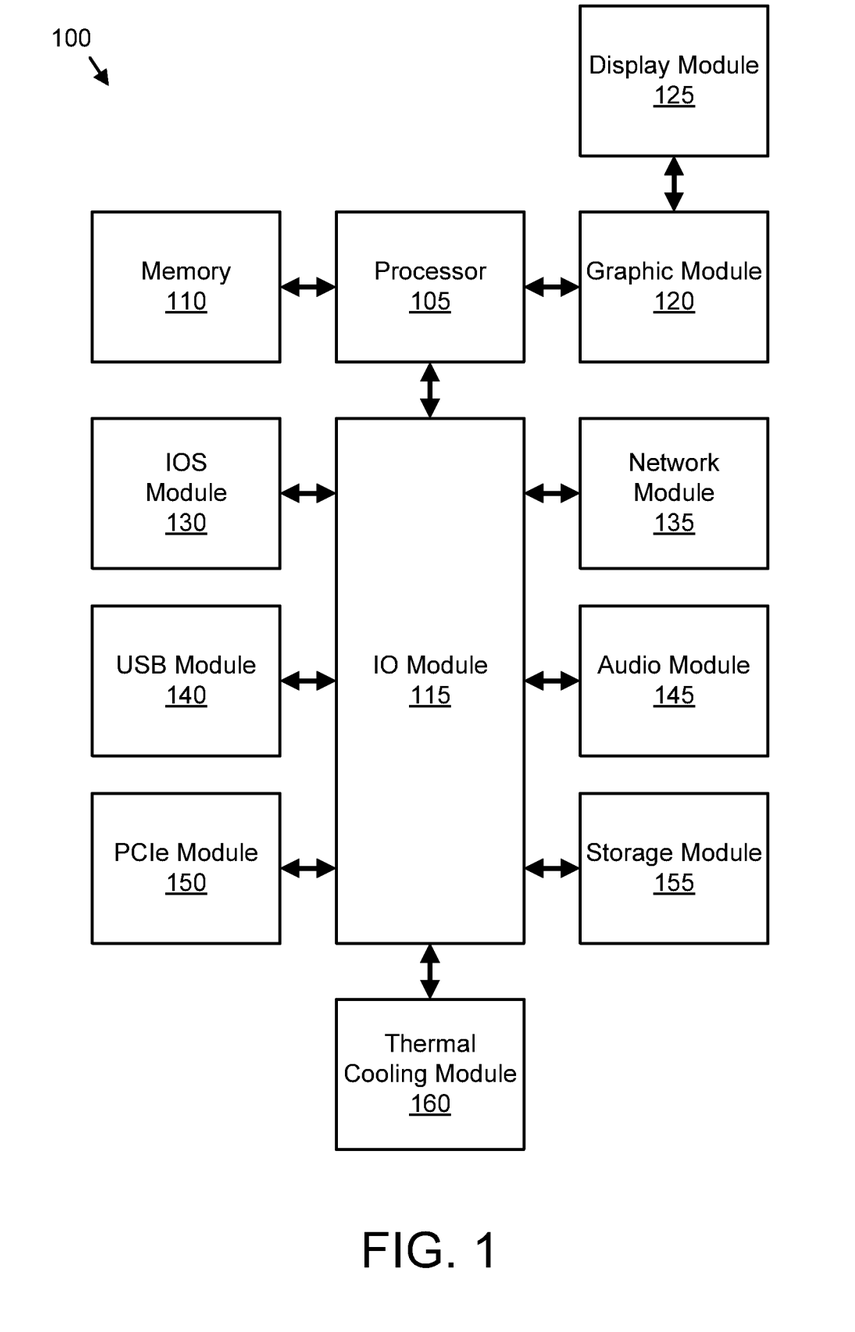
FIG. 1 is schematic block diagram illustrating one embodiment of an information processing system.

FIG. 1 is a schematic block diagram illustrating one embodiment of an information processing system 100. The information processing system 100 includes a processor 105, a memory 110, an IO module 115, a graphics module 120, a display module 125, an input/output system ("IOS") module 130, a network module 135, a universal serial bus ("USB") module 140, an audio module 145, a peripheral component interconnect express ("PCIe") module 150, a storage module 155, and a thermal cooling module 160. One of skill in the art will recognize that other configurations of an information processing system 100 or multiple information processing systems 100 may be employed with the embodiments described herein.

The processor 105, memory 110, IO module 115, graphics module 120, display module 125, IOS module 130, network module 135, USB module 140, audio module 145, PCIe module 150, storage module 155, and/or thermal cooling module 160 referred to herein as components, may be fabricated using semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices. In some embodiments, an information processing system may only include a subset of the components 105-160 shown in FIG. 1.

The memory 110 stores computer readable programs. The processor 105 executes the computer readable programs as is well known to those skilled in the art. The computer readable programs may be tangibly stored in the storage module 155. The storage module 155 may comprise at least one Solid State Device ("SSD"). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the IOS module 130, the network module 135, the PCIe module 150, the storage module 155, and/or the camera module 106.

The PCIe module 150 may communicate with the IO module 115 for transferring/receiving data or powering peripheral devices. The PCIe module 150 may include a PCIe bus for attaching the peripheral devices. The PCIe bus can logically connect several peripheral devices over the same set of connections. The peripherals may be selected from a printer, a joystick, a scanner, a camera, or the like. The PCI module 150 may also comprise an expansion card as is well known to those skilled in the art.

The IOS module 130 may communicate instructions through the IO module 115 to boot the information processing system 100, so that computer readable software instructions stored on the storage module 155 can load, execute, and assume control of the information processing system 100. Alternatively, the IOS module 130 may comprise a coded program embedded on a chipset that recognizes and controls various devices that make up the information processing system 100.

The IOS module 130 refers to various approaches to providing a firmware interface for booting an information processing system 100, including traditional basic input output system ("BIOS"), unified extensible firmware interface (UEFI), Open Firmware, and others. The IOS module 130 often includes a first storage device that stores the relevant instructions for booting. The first storage device may be a solid state storage device, such as Flash memory. The IOS module 130 may be a solid state storage device with relevant code that is attached to a motherboard of an information processing system 100. In many embodiments, aspects of the IOS module 130 may not be updated individually. For example, the IOS module 130 may contain thermal control tables. Making changes to the thermal control tables may require that the entire IOS module 130 be changed. This may be undesirable if the current version of the IOS module 130 is known to be stable.

The network module 135 may communicate with the IO module 115 to allow the information processing system 100 to communicate with other devices over a network. The devices may include routers, bridges, computers, information processing systems, printers, and the like. The display module 125 may communicate with the graphic module 120 to display information. The display module 125 may include a cathode ray tube ("CRT"), a liquid crystal display ("LCD") monitor, or the like. The USB module 140 may communicate with one or more USB compatible devices over a USB bus. The audio module 145 may generate an audio output.

The information processing system 100 may also include a thermal cooling module 160. The thermal cooling module 160 is responsible for providing temperature control. The thermal cooling module 160 may, for example, be a thermal control chip that takes temperature readings in the information processing system 100 and drives one or more fans in the information processing system 100 to manage the temperature. The thermal cooling module 160 may use devices for cooling other than fans. In one embodiment, the thermal cooling module 160 includes a microcontroller and solid state memory such as Flash memory. The thermal cooling module 160 may provide cooling for one or more components of the information processing system 100; for example, the thermal cooling module 160 may drive a fan that provides cooling for the processor 105. The thermal cooling module 160 may drive a fan that provides cooling for the graphic module 120, or a case fan providing cooling for the enclosure of the information processing system 100. Other components may be cooled by the thermal cooling module 160.

In many systems, the IOS module 130 contains a thermal control data structure that is used by the thermal cooling module 160 to regulate the temperature in the information processing system 100. The thermal control data structure may be tuned to balance cooling with acoustic considerations; for example, the thermal control data structure may direct the thermal cooling module 160 to drive the fans to provide cooling, but in such a way that the fan noise is kept as low as possible. If a user is not concerned about fan noise, but wants more cooling, or vice versa, the user may desire a custom thermal control data structure to do so. However, since the thermal control data structure is stored in the IOS module 130, providing a custom thermal control data structure requires changing the IOS module 130.

Figure 2:
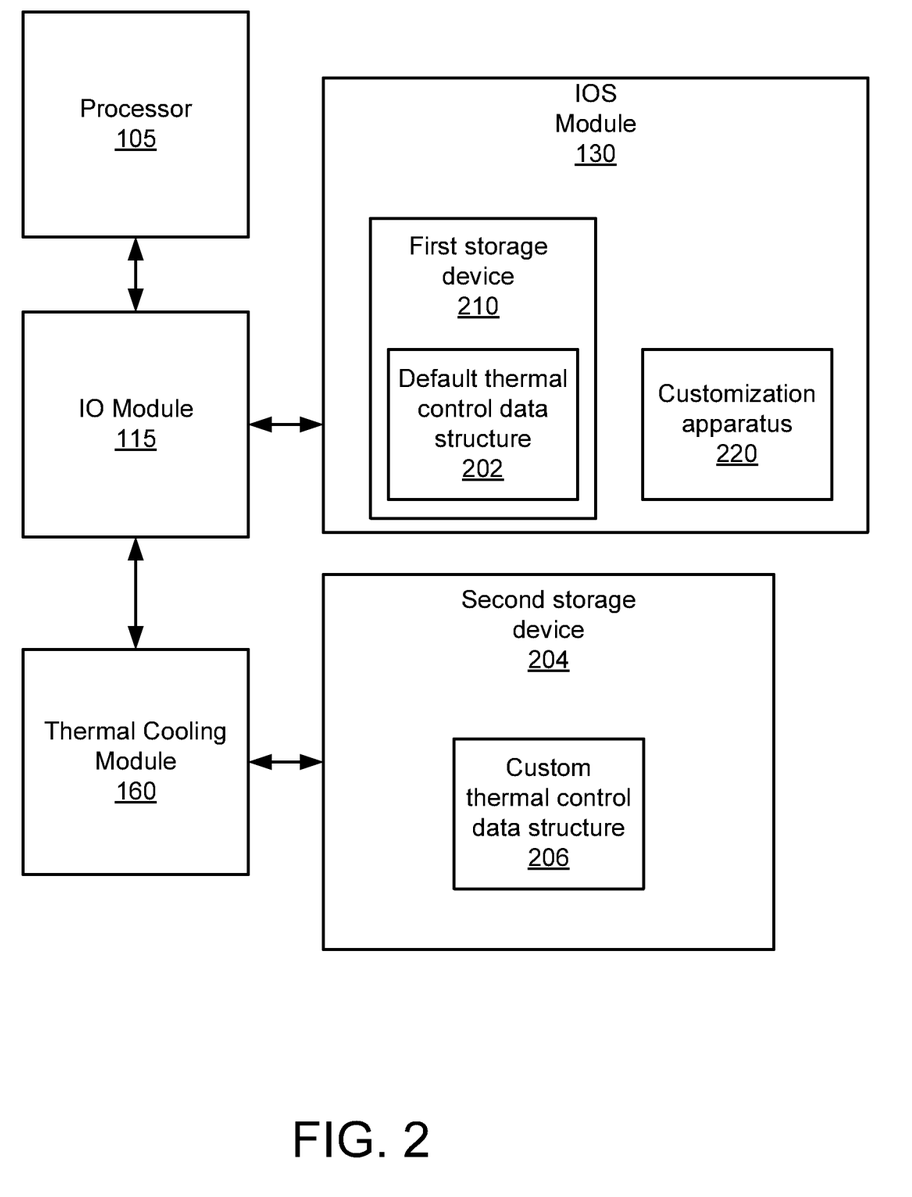
FIG. 2 is a schematic block diagram illustrating one embodiment of a second storage device in communication with a thermal cooling module and storing a custom thermal control data structure.

FIG. 2 shows one embodiment of components of the information processing system 100. FIG. 2 shows the processor 105, the IO module 115, the thermal cooling module 160, the IOS module 130, and a second storage device 204.

In the depicted embodiment, the IOS module 130 includes a first storage device 210. The first storage device 210 may be an electrically erasable programmable read-only memory (EEPROM) or other suitable non-volatile storage medium. The first storage device 210 may be, for example, Flash memory, FeRAM, MRAM, or other suitable memory. The first storage device 210 may store the necessary instructions allowing the IOS module 130 to boot the information processing system 100.

A default thermal control data structure 202 may be part of the IOS module 130 that is stored in the first storage device 210. The default thermal control data structure 202 is a data structure containing information used by the thermal cooling module 160 for cooling one or more of the components of the information processing system 100. For example, the default thermal control data structure 202 may be a thermal control table that specifies a particular fan speed for a range of temperature measurements. The module IOS module 130 may include the default thermal control structure 202 by default.

The IOS module 130 may also include a customization apparatus 220 that allows for a custom thermal control data structure 206. While the customization apparatus 220 is shown in FIG. 2 as being part of the IOS module 130, the customization apparatus 220 may be implemented elsewhere in the information processing system 100. In one embodiment, the customization apparatus 220 may be distributed across the IOS module 130 and the thermal cooling module 160.

The information processing system 100 may also include a second storage device 204. The second storage device 204 may be an electrically erasable programmable read-only memory (EEPROM) or other suitable non-volatile storage medium. The second storage device 204 may be, for example, Flash memory, FeRAM, MRAM, or other suitable memory. While FIG. 2 shows the second storage device 204 as separate from the thermal cooling module 160, in certain embodiments, the second storage device 204 is part of the thermal cooling module 160. For example, the second storage device 204 may be a memory device on a thermal control chip.

The second storage device 204 is separately updatable from the first storage device 210. Separately updatable means that the data in the second storage device 204 can be updated without updating the data in the first storage device 210. As a result, a custom thermal data structure 206 can be stored in the second storage device 204 without updating the IOS module 130. Changes can be made to the custom thermal control data structure 206 without updating the IOS module 130.

The second storage device 204 may include a custom thermal control data structure 206. The custom thermal control data structure 206 is a thermal control data structure 306 with one or more values that differ from the values in the default thermal control data structure 202. The customization apparatus 220 may store the custom thermal control data structure 206 in the second storage device 204. The customization apparatus may also direct the thermal cooling module 160 to use the custom thermal control data structure 206 in the second storage device 204 for cooling one or more components of the information processing system 100.

The term "custom" as used in the phrase custom thermal control data structure 206, means a thermal control data structure that is different than the default thermal control data structure 202 stored in the IOS module 130. The term custom is not intended to mean that the custom thermal control data structure 206 is custom-made for a particular individual. While the custom thermal control data structure 206 may indeed be custom-made, this need not be the case. The term "custom" is used to emphasize the customizable nature of the custom thermal control data structure 206.

Figure 3:
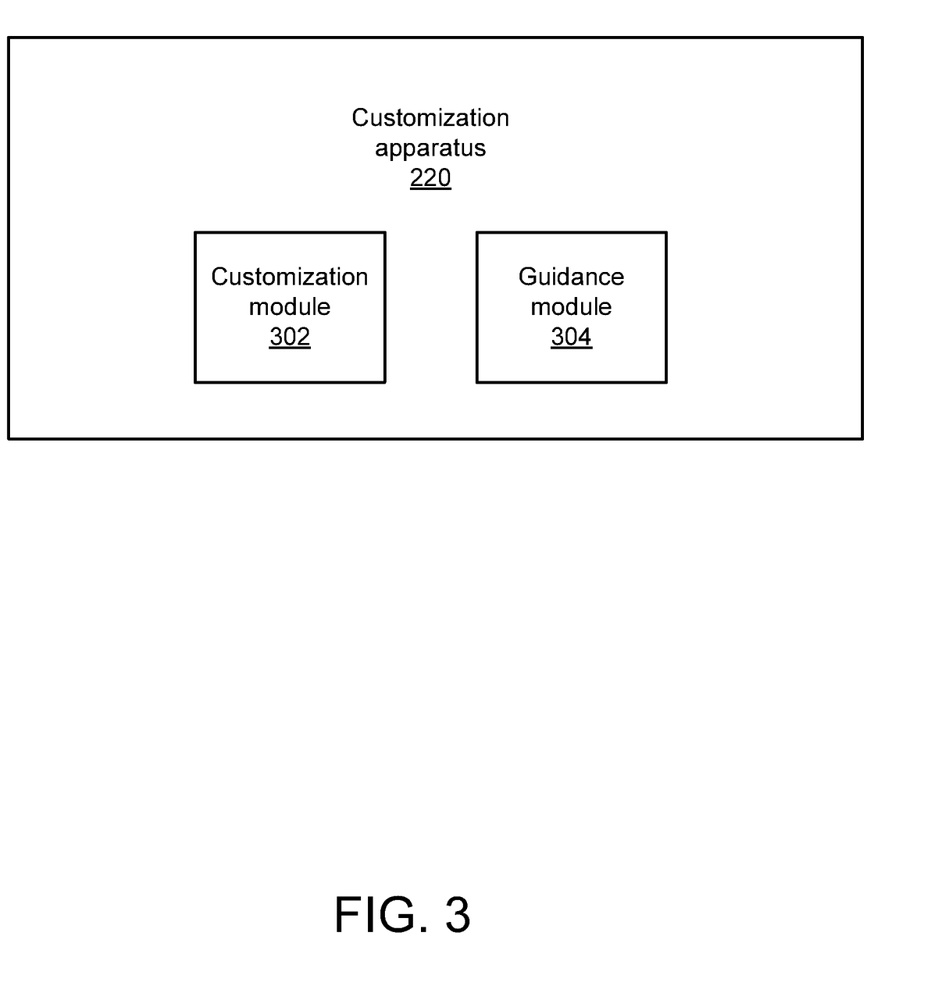
FIG. 3 is a schematic block diagram illustrating one embodiment of a customization apparatus.

FIG. 3 shows one embodiment of a customization apparatus 220. The customization apparatus 220 may include a customization module 302 and a guidance module 304. The customization module 302 may store the custom thermal control data structure 206 in the second storage device 204 that is separately updatable from the first storage device 210 storing the IOS module 130. The IOS module 130 comprises the default thermal control data structure 202. The default thermal control data structure 202 may be saved within the first storage device 210 when the data of the IOS module 130 is saved to the first storage device 210. For example, an update to the IOS module 130 may update the default thermal control data structure 202.

The customization module 302 may receive one or more values for the custom thermal control data structure 206 and update the custom thermal control data structure 206 with these values. The values maybe, in one embodiment, customized associations between temperature in the information processing system 100, or one or more components within the information processing system 100, and cooling activity. For example, the values may include a temperature range and a fan speed that the thermal cooling module 160 should use within that temperature range.

In one embodiment, the customization module 302 presents a graphical user interface that allows a user to enter new values in the custom thermal control data structure 206. For example, the customization module 302 may present one or more options for entering values in an IOS setup utility that allows a user to customize certain behaviors of the IOS module 130. The customization module 302 may allow a user to enter custom values such as temperature and fan speed. The customization module 302 may, in one embodiment, present the user with the option of choosing between one or more preset custom thermal control data structures 206; for example, the customization module 302 may present a first custom thermal control data structure 206 that is optimized for maximum cooling. The customization module 302 may present a second custom thermal control data structure that is optimized for reduced fan noise. The user may choose from among the one or more custom thermal control data structures 206 and select one via the IOS setup utility.

In another embodiment, the user is given the option in the IOS setup utility of selecting the custom thermal control data structure 206, but is not given the ability to enter new values creating the custom thermal control data structure 206. The user may be required to execute a separate setup utility that updates the second storage device 204. For example, the user may be provided with a setup utility that access the microcontroller and memory of a thermal control chip and writes the custom thermal control data structure 206 to the memory of the thermal control chip. The setup utility, and the associated values for the custom thermal control data structure 206, may be provided by a customer service representative in order to reduce the possibility of the user entering inappropriate values into the custom thermal control data structure 206.

The customization apparatus 220 may also include a guidance module 304 that directs the thermal cooling module 160 to use the custom thermal control data structure 206 for cooling one or more of the components of the information processing system 100. The guidance module 304 may, for example, create one or more entries in configuration registers that direct the thermal cooling module 160 to the custom thermal control data structure 206 stored in the second storage device. The thermal cooling module 160 may read the registers which direct the thermal cooling module 160 to load the custom thermal control data structure 206 from the second storage device 204 instead of the first storage device 210. The registers may direct the thermal cooling module 160 to the memory location in the second storage device 204 where the custom thermal control data structure 206 is stored.

Figure 4:
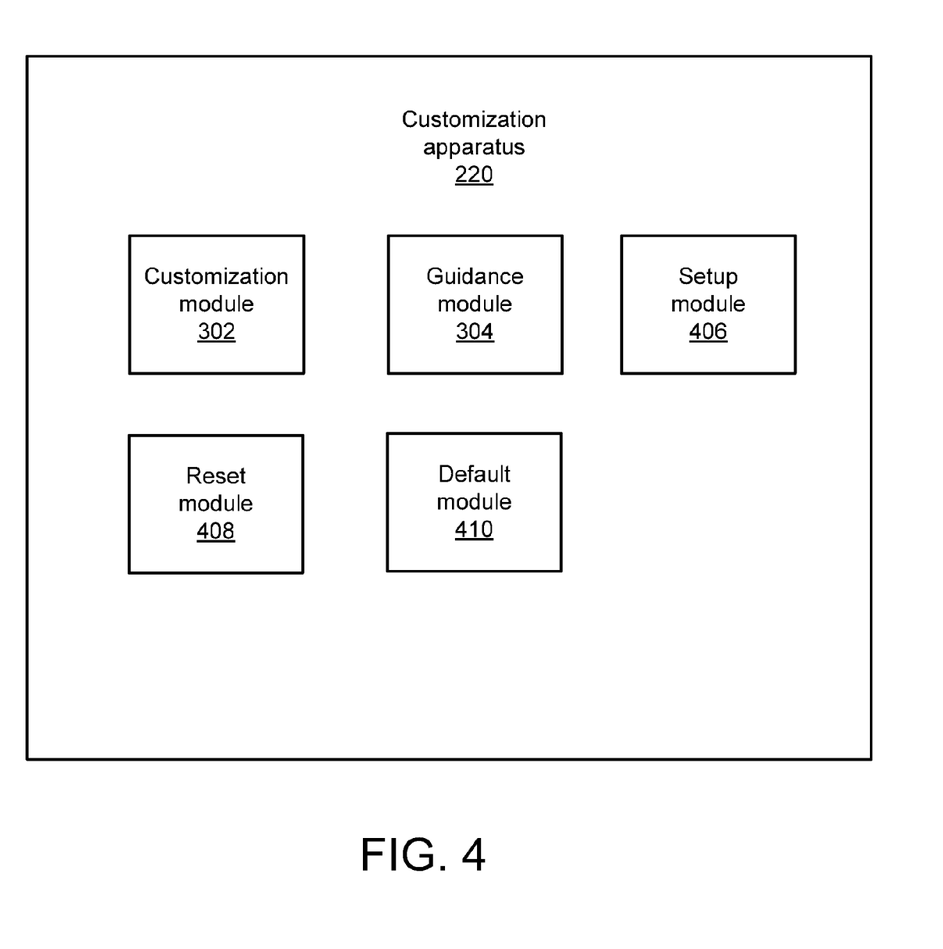
FIG. 4 is a schematic block diagram illustrating a second embodiment of a customization apparatus.

FIG. 4 shows a second embodiment of a customization apparatus 220 that includes a customization module 302, a guidance module 304, a setup module 406, a reset module 408, and a default module 410.

The customization apparatus 220 may be configured to direct the information processing system 100 to use the default thermal control data structure 202 by default. In such embodiments, the thermal cooling module 160 may default to using the default thermal control data structure 202 unless the thermal cooling module 160 receives an indicator instructing the thermal cooling module 160 to use the custom thermal control data structure 206.

The setup module 406 may receive a selection of the custom thermal control data structure 206 from a user. As explained above, in one embodiment, the user may select use of the custom thermal control data structure 206 using an IOS setup utility. The guidance module 304 may direct the thermal cooling module 160 to use the custom thermal control data structure 206 when the user selects the custom thermal control data structure 206. The thermal cooling module 160 may then begin using the custom thermal control data structure 206 to provide cooling as opposed to the default thermal control data structure 202.

The customization apparatus 220 may also include a reset module 408. The rest module 408 may restore the custom thermal control data structure 206 to the values in the default thermal control data structure 202 in response to the IOS module 130 being restored to default values. For example, a user or process may initiate a total system reset. The total system reset may involve restoring the IOS module 130 to default values. The default values may include the default thermal control data structure 202. In order to ensure that the system reset is complete, the reset module 408 may change the custom thermal control data structure 206 such that it is identical to the default thermal control data structure 202 in order to ensure that the total system reset is complete.

The customization apparatus 220 may also include a default module 410. The default module 410 may direct the thermal cooling module 160 to use the default thermal control data structure 202 in the first storage device 210 in response to the custom thermal control data structure 206 being corrupted. For example, if the thermal cooling module 160 cannot read certain values in the custom thermal control data structure 206, or values are missing, the default module 410 may determine that the custom thermal control data structure 206 is corrupt.

The thermal cooling module 160 may be configured to shut down the information processing system 100 if it determines that temperatures are so high that damage to one or more components of the information processing system 100 due to heat is imminent. The default module 410 may track the number of times such shutdowns are initiated. If the number of such shutdowns for a certain time period exceeds a threshold amount while the thermal cooling module 160 is using the custom thermal control data structure 206, the default module 410 may direct the thermal cooling module 160 to use the default thermal control data structure 202 instead.

In certain embodiments, the default module 410 directs the thermal cooling module 160 to use the default thermal control data structure 202 in response to the information processing system 100 being started in safe mode. Safe mode refers to a diagnostic mode of an information processing system 100 that generally starts the information processing system 100 in a known good configuration, and disables certain components in the information processing system 100. When a user or process starts the information processing system 100 in safe mode, the default module 410 may direct the thermal cooling module 160 to use the default thermal control data structure 202 in the IOS module 130 as a measure to increase stability.

Figure 5:
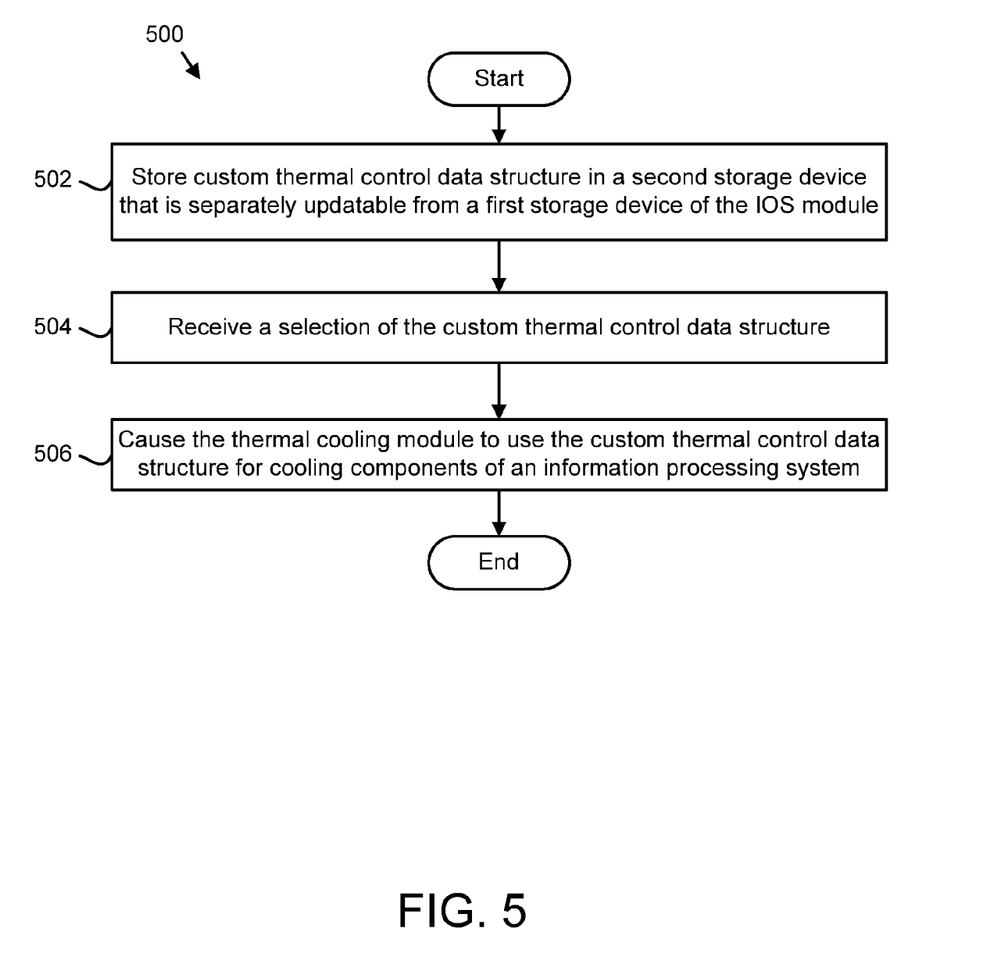
FIG. 5 is a schematic flow chart diagram showing one embodiment of a method for providing a customized thermal control data structure.

FIG. 5 shows one embodiment of a method 500 for customization of thermal control data structures. The method 500 may, in various embodiments, include more or different steps than those shown. The method 500 may include storing 502 the custom thermal control data structure 206 in a second storage device 204 that is separately updatable from the first storage device 210 of the IOS module 130 that includes the default thermal control data structure 202. In one embodiment, the custom thermal control data structure 206 is stored in a second storage device 204 of the thermal cooling module 160. As explained above, the thermal cooling module 160 may be a thermal control chip that includes a microprocessor and memory. The method 500 may involve storing the custom thermal control data structure 206 in the thermal control chip.

The method 500 may further involve receiving 504 a selection of the custom thermal control data structure 206. The user may provide the selection via an IOS setup utility that allows the user to select which thermal control data structure to use. The selection may, in certain embodiments, be performed by a process or other client as opposed to a user.

The method 500 may also involve directing 506 the thermal cooling module 160 to use the custom thermal control data structure 206 for cooling components of the information processing system 100. As a result, the user may customize the thermal control data structure used for an information processing system 100, and thereby customize the cooling behavior of the information processing system 100 and tailoring the cooling behavior to a particular environment.

Figure 6:
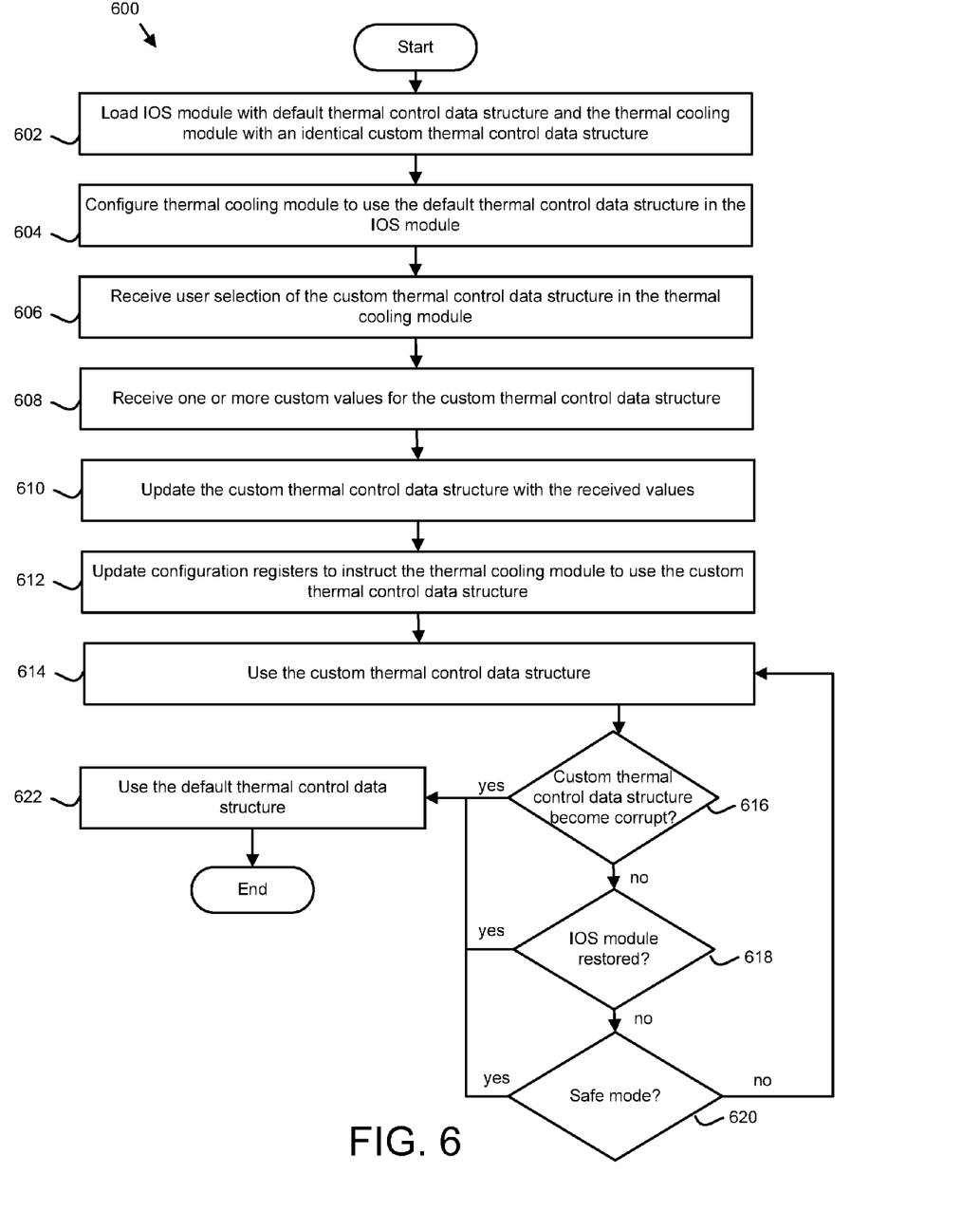
FIG. 6 is a schematic flow chart diagram showing an example embodiment of a method for providing a customized thermal control data structure.

FIG. 6 shows one embodiment of a method 600 implementing a customized thermal control data structure. The method 600 is by way of example, and not by way of limitation. Other approaches may be used to customize a thermal control data structure other than that shown and discussed in connection with FIG. 6.

The method 600 begins with loading 602 the IOS module 130 with a default thermal control data structure 202, and loading the thermal cooling module 160 with a custom thermal control data structure 206 that is identical to the default thermal control data structure 202. Copying the default thermal control data structure 202 to the second storage device 204, such that the custom thermal control data structure 206 is identical with the default thermal control data structure 202, may prevent errors in the event the user accidentally selects the custom thermal control data structure 206 without providing appropriate values. As such, it may be beneficial to populate the custom thermal control data structure 206 with valid values during manufacture of the initial information processing system 100. The method 600 may also involve configuring the thermal cooling module 160 to use the default thermal control data structure 202 in the IOS module 130 by default.

The method 600 may involve receiving 606 a user selection of the custom thermal control data structure 206 that is stored in the thermal cooling module 160. The user may provide the selection using an IOS setup utility, or through other means. The method 600 may also involve receiving 608 one or more custom values for the custom thermal control data structure 206, and updating 610 the custom thermal control data structure 206 (previously populated with the default values in the default thermal control data structure 202) with the received values.

The method 600 may also involve updating 613 configuration registers to instruct the thermal cooling module 160 to use the custom thermal control data structure 206 stored in the thermal cooling module 160 instead of the default thermal control data structure 202 stored in the IOS module 130. The thermal cooling module 160 may read the configuration registers and be directed to use 614 the custom thermal control data structure 206 in cooling the information processing system 100.

The method 600 may further involve determining 616 whether the custom thermal control data structure 206 becomes corrupt. If the custom thermal control data structure has become corrupt, the thermal cooling module 160 may use 622 the default thermal control data structure 202 of the IOS module 130.

The method 600 may also involve determining 618 whether the IOS module 130 has been restored. If the IOS module 130 has been restored, the thermal cooling module 160 may use 622 the default thermal control data structure 622 of the IOS module 130.

The method 600 may also involve determining 620 whether the information processing system 100 is operating in safe mode. If the information processing system 100 is operating in safe mode, the thermal cooling module 160 may use 622 the default thermal control data structure 622 of the IOS module 130.

If the custom thermal control data structure 206 is not corrupt, the IOS module 130 has not been restored, and the information processing system 100 is not operating in safe mode, the thermal cooling module 160 may continue to use the custom thermal control data structure 206.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a thermal cooling circuit that drives a fan;
an input output (IO) circuit coupled to an input output system (IOS) circuit and comprising a first storage device that stores a default thermal control data structure and that communicates with the thermal cooling circuit over the IO circuit;
a second storage device that is only in communication with the thermal cooling circuit and that communicates with the IOS circuit through the thermal cooling circuit and the IO circuit;
a processor that stores a custom thermal control data structure in the second storage device, wherein the second storage device is separately updatable through the thermal cooling circuit; and
the processor further writes entries to configuration registers for the thermal control circuit in response to a selection of the custom thermal control data structure, wherein the entries direct the thermal cooling circuit to use the custom thermal control data structure on the second storage device to control cooling one or more components of an information processing system.

2. The apparatus of claim 1, the thermal control circuit further receiving one or more values for the custom thermal control data structure and updating the custom thermal control data structure with the one or more values.

3. The apparatus of claim 1, wherein the thermal cooling circuit uses the default thermal control data structure by default.

4. The apparatus of claim 3, wherein the processor writes the entries to the configuration registers to direct the thermal cooling circuit to use the custom thermal control data structure in response to a user selecting the custom thermal control data structure.

5. The apparatus of claim 1, wherein the thermal control circuit that receives a selection of the custom thermal control data structure from a user.

6. The apparatus of claim 1, wherein the processor further restores the custom thermal control data structure to values in the default thermal control data structure in response to the IOS circuit being restored to default values.

7. The apparatus of claim 1, wherein the processor further writes alternate entries to the configuration registers to direct the thermal cooling circuit to use the default thermal control data structure stored in the first storage device in response to the custom thermal control data structure being corrupted.

8. A method comprising:
storing a default thermal control data structure in a first storage device of an input output system (IOS) circuit that communicates with a thermal cool circuit over an input output (IO) circuit, wherein the thermal cooling circuit drives a fan;
storing a custom thermal control data structure in a second storage device that is only in communication with the thermal cooling circuit, wherein the second storage device communicates with the IOS circuit through the thermal cooling circuit and the IO circuit, and is separately updatable through the thermal cooling circuit;
receiving a selection of the custom thermal control data structure; and
writing entries to configuration registers for the thermal control circuit in response to the selection of the custom thermal control data structure, wherein the entries direct the thermal cooling circuit to use the custom thermal control data structure on the second storage device to control cooling one or more components of an information processing system.

9. The method of claim 8, further comprising receiving one or more values for the custom thermal control data structure and updating the custom thermal control data structure with the one or more values.

10. The method of claim 8, further comprising restoring the custom thermal control data structure to values in the default thermal control data structure in response to the IOS circuit being restored to default values.

11. The method of claim 8, further comprising initially populating the custom thermal control data structure with one or more values in the default thermal control data structure.

12. The method of claim 8, further comprising writing alternate entries to the configuration registers to direct the thermal cooling circuit to use the default thermal control data structure stored in the first storage device in response to the custom thermal control data structure being corrupted.

13. The method of claim 8, further comprising writing alternate entries to the configuration registers to direct the thermal cooling circuit to use the default thermal control data structure stored in the first storage device in response to the information processing system being started in a safe mode.

14. A computer program product comprising a non-transitory storage device storing machine readable code executed by a processor to perform the operations of:
storing a default thermal control data structure in a first storage device of an input output system (IOS) circuit that communicates with a thermal cool circuit over an input output (IO) circuit, wherein the thermal cooling circuit drives a fan;
storing a custom thermal control data structure in a second storage device that is only in communication with the thermal cooling circuit, wherein the second storage device communicates with the IOS circuit through the thermal cooling circuit and the IO circuit, and is separately updatable through the thermal cooling circuit;
receiving a selection of the custom thermal control data structure; and
writing entries to configuration registers for the thermal control circuit in response to the selection of the custom thermal control data structure, wherein the entries direct the thermal cooling circuit to use the custom thermal control data structure on the second storage device to control cooling one or more components of an information processing system in response to receiving the selection.

15. The computer program product of claim 14, further comprising receiving one or more values for the custom thermal control data structure and updating the custom thermal control data structure with the one or more values.

16. The computer program product of claim 14, further comprising restoring the custom thermal control data structure to values in the default thermal control data structure in response to the IOS being restored to default values.

17. The computer program product of claim 14, further comprising initially populating the custom thermal control data structure with one or more values in the default thermal control data structure.

18. The computer program product of claim 14, further comprising writing alternate entries to the configuration registers to direct the thermal cooling circuit to use the default thermal control data structure stored in the first storage device in response to the custom thermal control data structure being corrupted.

19. The computer program product of claim 14, further comprising writing alternate entries to the configuration registers to direct the thermal cooling circuit to use the default thermal control data structure stored in the first storage device in response to the information processing system being started in a safe mode.

* * * * *